United States Patent [19]

Hart

[11] Patent Number: 5,282,974
[45] Date of Patent: Feb. 1, 1994

[54] METHOD FOR REMOVING SOLUBLE BENZENE FROM EFFLUENT WATER

[76] Inventor: Paul R. Hart, 2710 Echo St., The Woodlands, Tex. 77380

[21] Appl. No.: 66,837

[22] Filed: May 24, 1993

[51] Int. Cl.$^5$ ............................................. B01D 11/04
[52] U.S. Cl. ................................... 210/639; 210/634; 210/708; 210/735; 210/909
[58] Field of Search ............... 210/708, 634, 638, 639, 210/735, 909

[56] References Cited

U.S. PATENT DOCUMENTS

| | | | |
|---|---|---|---|
| 4,800,039 | 1/1989 | Hassick et al. | 252/181 |
| 5,015,391 | 5/1991 | Mohn | 210/728 |
| 5,076,939 | 12/1991 | Hunter et al. | 210/734 |
| 5,167,830 | 12/1992 | Ficker | 210/735 |

*Primary Examiner*—Neil M. McCarthy

[57] ABSTRACT

Disclosed are methods for removing benzene from hydrocarbon process waters. These methods include adding aluminum chlorohydrate to the water and then separating the benzene by solvent extraction.

8 Claims, No Drawings

1

METHOD FOR REMOVING SOLUBLE BENZENE FROM EFFLUENT WATER

FIELD OF THE INVENTION

The present invention relates to a method for removing nonionic water soluble species, such as benzene, from water.

BACKGROUND OF THE INVENTION

Crude oil desalting is a common emulsion breaking method where an emulsion is first intentionally formed. Water is added in an amount of approximately 5% to 10% by volume of crude. The added water is intimately mixed with the crude oil to contact the impurities therein thereby transferring these impurities into the water phase of the emulsion. The emulsion is usually resolved with the assistance of emulsion breaking chemicals, characteristically surfactants, and by the known method of providing an electrical field to polarize the water droplets. Once the emulsion is broken, the water and petroleum media form distinct phases. The water phase is separated from the petroleum phase and subsequently removed from the desalter. The petroleum phase is directed further downstream for processing through the refinery operation.

The water phase, an effluent brine, will contain the salts removed from the petroleum charge. Also present in the desalter effluent brine will be organic species. The insoluble species can be removed by traditional means (e.g., chemical flocculants), but significantly soluble species, such as benzene, still remain. Because benzene is a volatile organic carcinogen its content in wastewater is restricted by environmental regulations. Accordingly, the effluent brine typically must be treated to reduce the amount of benzene to acceptable levels for disposal. Other effluent waters include sour water stripper effluent, crude tower overhead, condensate water, crude oil and fuel tank settling draws, various petrochemical process effluent waters, or any water that has come in contact with an organic fluid where that portion of the organic fluid which has dissolved in the water must be removed.

This invention particularly applies to those organic species which are nonionic, that is, not ionizable acids or bases, and therefore relatively unaffected by pH, but are polar enough to have significant solubility in water. Species such as these which are also relatively volatile and/or carcinogenic, such as benzene, are of particular concern.

The present inventor discovered that appropriate treatments of effluent water can desolubilize the benzene and increase the amount removed by traditional techniques, such as extraction, stripping, and distillation.

SUMMARY OF THE INVENTION

The present invention relates to methods for removing soluble organic species from water. These methods are particularly effective at removing nonionic species like benzene. The treatment is the addition of aluminum chlorohydrate to the brine followed by solvent extraction, gas sparging or distillation.

DESCRIPTION OF THE RELATED ART

U.S. Pat. No. 4,800,039 teaches of a composition for reducing turbidity in aqueous systems comprising aluminum chlorohydrate and either of a water-soluble polyamine or a water-soluble $C_1$ to $C_8$ dialkyl diallyl ammonium polymer.

DETAILED DESCRIPTION OF THE INVENTION

It has been discovered that the efficiency of the removal of benzene from an effluent water can be enhanced by the addition of aluminum chlorohydrate. The aluminum chlorohydrate is blended with the effluent to desolubilize nonionic organic species. This salting out effect has been shown to vary with the crystallographic radius of the ions. The smaller the ion the more it salts out. As the ions get bigger, at some point, they start "salting in", i.e. making organic compounds more soluble in water. As anions go, $F^-$ is the smallest, but fluoride salts are toxic. The $OH^-$ anion is somewhat larger but still smaller than $Cl^-$. However, alkaline metal and alkaline earth hydroxides are not only corrosive, but create soluble salts of organic acids. Salts compatible with and often used in water treatment, such as $FeCl_2$, $AlCl_3$, and $Al_2(SO_4)_3$ have large ions that do not salt out sufficiently. Aluminum chlorohydrate, $Al_2Cl(OH)_5$, is pH neutral, compatible with water treatment, and has mostly small $OH^-$ anions that salt out effectively.

An oil-in-water flocculant or reverse breaker, such as poly(diallyldimethyl ammonium chloride) can then be used, in a known manner, to coagulate the dispersed oil. The resultant floc can then be easily removed. A significant portion of the benzene originally dissolved in the water is removed with the floc.

Subsequently, additional benzene can be removed from the effluent by solvent extraction or sparging (stripping) with a gas. The amount of additional benzene which is removed in such a process is increased from that normally seen by the presence of the aluminum chlorohydrate in the water. The speed or throughput of a solvent extraction phase can be enhanced by the addition of oil-in-water demulsifiers such as Embreak ®2W119, available from Betz Process Chemicals, the Woodlands, Texas, in a known manner.

The effluents which are treated range in temperature from 0° F. to about 300° F.

The aluminum chlorohydrate may be added to the effluent in an amount ranging from 20 parts to about 100,000 parts per million. Economical treatments to remove adequate benzene would typically be in the 10 to 1000 ppm range. The aluminum chlorohydrate can be added to the effluent as a solution in water.

The data set forth below were developed and demonstrate the unexpected results occasioned by use of the invention. The following examples are included as being illustrations of the invention and should not be construed as limiting the scope thereof.

EXAMPLES

The removal of benzene from the desalter effluent brine in a working petroleum refinery was studied. Benzene removal by oil washing (solvent extraction) with and without the addition of aluminum chlorohydrate was studied. Practical temperatures (250° F. at treatment point, 80° F. at extraction), residence times (20 minutes), mixing action (high shear), and chemical dosages (less than about 50 ppm active per brine volume) were used to emulate real world conditions.

The results of this testing are reported in Table I.

TABLE I

| Treatment (ppm) Al$_2$Cl(OH)$_5$ | Active 1 RB | Active 2 EB | Benzene (ppm)* | % Removal from Original | % Reduction in Residual |
|---|---|---|---|---|---|
| 0 | 0 | 0 | 2.7 | 86.4 | 0 |
| 25 | 5 | 7.5 | 2.2 | 88.9 | 18.5 |
| 31.25 | 6.25 | 0 | 2.0 | 89.9 | 25.9 |

*in water. With no gas oil washing, level was 19.8 ppm
[1]Reverse (oil-in-water) emulsion breaker, Poly(DADMAC)
[2]Primary (water-in-oil) emulsion breaker, alkoxylated alkylphenolic resin The data indicate that adding increased amounts of aluminum chlorohydrate (Al$_2$Cl(OH)$_5$) to a refinery crude oil desalter effluent brine prior to extracting it with light hydrocarbon gas oil increased the amounts of benzene in the extracting oil phase.

Although only tested above in conjunction with a flocculant, the addition of 1200 ppm aluminum chlorohydrate alone to a clear solution of effluent from a coal mining process containing trace hydraulic oil compounds caused that solution to become visibly cloudy. The addition of flocculants alone to this effluent, or of aluminum chlorohydrate to tap water, did not result in any visible desolubilization.

The same desolubilization effect noted above also lowers the latent energy of evaporation, and has improved the efficiency of benzene strippers used to sparge volatile organics from ethylene plant effluent water.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method of removing soluble benzene from hydrocarbon process effluent water comprising contacting the water with a sufficient amount of aluminum chlorohydrate; and thereafter solvent extracting said benzene from said effluent water, said amount being sufficient for the purpose of increasing the amount of said benzene removed from the water by solvent extraction in the absence of said aluminum chlorohydrate.

2. The method of as claimed in claim 1 wherein said aluminum chlorohydrate is added to said effluent water in an amount ranging from about 10 parts to about 200,000 parts per million parts said effluent water.

3. The method as claimed in claim 1 wherein said extracting is with a hydrocarbon solvent.

4. The method as claimed in claim 3 wherein a demulsifier is employed with said hydrocarbon solvent.

5. The method as claimed in claim 4 wherein said demulsifier is an oil-in-water demulsifier.

6. The method as claimed in claim 4 wherein said demulsifier is a water-in-oil demulsifier.

7. The method as claimed in claim 5 wherein said oil-in-water demulsifier is poly(diallyldimethylammonium chloride).

8. The method as claimed in claim 5 wherein said water-in-oil demulsifier is an alkoxylated alkylphenolic resin.

* * * * *

UNITED STATES PATENT AND TRADEMARK OFFICE
CERTIFICATE OF CORRECTION

PATENT NO. : 5,282,974
DATED : Feb. 1, 1994
INVENTOR(S) : Paul R. Hart

It is certified that error appears in the above-identified patent and that said Letters Patent is hereby corrected as shown below:

On the title of the patent, please add the following:

[73] Assignee: Betz Laboratories, Inc., Trevose, PA

Attorney, Agent, or Firm - Alexander D. Ricci; Philip H. VonNeida

Signed and Sealed this

Fifth Day of July, 1994

Attest:

*Attesting Officer*

BRUCE LEHMAN

*Commissioner of Patents and Trademarks*